US012785962B1

(12) United States Patent
Jamil

(10) Patent No.: US 12,785,962 B1
(45) Date of Patent: Nov. 3, 2026

(54) SYSTEM AND METHOD FOR HARDWARE-GUIDED CRYPTOGRAPHIC ALGORITHM EVALUATION USING EFFICIENCY-ADJUSTED SECURITY

(71) Applicant: United Arab Emirates University, Al Ain (AE)

(72) Inventor: Norziana Jamil, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 19/436,553

(22) Filed: Dec. 30, 2025

(51) Int. Cl.
*H04L 29/06* (2006.01)
*H04L 9/30* (2006.01)

(52) U.S. Cl.
CPC .................................. *H04L 9/3006* (2013.01)

(58) Field of Classification Search
CPC ..... H04L 9/3006; H04L 9/3066; H04L 9/003; H04L 2209/122
See application file for complete search history.

(56) References Cited

U.S. PATENT DOCUMENTS 11,900,290 B1 * 2/2024 Schuck ............ G06Q 10/06315
2007/0110225 A1 * 5/2007 Leventhal ............. H04L 9/0618 380/37
2009/0307204 A1 * 12/2009 Shacham ............ G06F 30/3323 707/999.005
2015/0312027 A1 * 10/2015 Kim ........................ H04L 9/002 380/28
2016/0357580 A1 * 12/2016 Lyashevsky ........ G06F 11/3409
2021/0314418 A1 * 10/2021 Abdul Wahab ....... G06F 9/5088
2022/0377469 A1 * 11/2022 Mendez Rodriguez ..................... H04R 29/00
2023/0126984 A1 * 4/2023 Beckwith .............. H04L 9/0819 380/282
2024/0244091 A1 * 7/2024 Kalle ........................ H04L 9/40
2024/0259836 A1 * 8/2024 Shete ................. H04B 17/3913
2024/0421972 A1 * 12/2024 Wang ......................... H04L 9/06
2025/0081101 A1 * 3/2025 Soldati .............. H04W 36/0066
2025/0291896 A1 * 9/2025 Lang, Sr. ................ G06F 21/54
2026/0050479 A1 * 2/2026 Chainani ............... G06F 9/5027

* cited by examiner

*Primary Examiner* — Dao Q Ho
(74) *Attorney, Agent, or Firm* — MH2 Technology Law Group, LLP

(57) ABSTRACT

The present disclosure provides a system for evaluating cryptographic algorithms based on security and implementation efficiency. The system comprises a security parameters module receiving security level value S, an efficiency metrics collector obtaining performance measurements including energy consumption E, memory usage M, and execution time T from hardware execution, and a configuration profile module defining tunable weight parameters $w_1$, $w_2$, $w_3$ for each measurement. The configuration profile module includes predefined Battery-Constrained, Latency-Critical, and Memory-Constrained profiles mapping device constraints to weight parameter values. The system comprises a computation engine calculating an Efficiency-Adjusted Security (EAS) score using $EAS=S/(w_1E+w_2M+w_3T)$, representing a security-to-cost ratio for ranking algorithms. The system comprises a recommendation engine ranking cryptographic algorithms based on computed EAS scores and a deployment module automatically embedding selected algorithms into embedded device firmware.

17 Claims, 4 Drawing Sheets

SYSTEM AND METHOD FOR HARDWARE-GUIDED CRYPTOGRAPHIC ALGORITHM EVALUATION USING EFFICIENCY-ADJUSTED SECURITY

FIELD OF INVENTION

The present disclosure relates to cryptographic algorithm evaluation systems, and more particularly to a hardware-guided system and method for evaluating and selecting cryptographic algorithms using an Efficiency-Adjusted Security (EAS) metric that combines real-time hardware performance measurements with security assessments for deployment in resource-constrained environments.

BACKGROUND

In modern computing environments, cryptographic algorithms serve as the foundation for securing data transmission and storage across a wide range of applications, from personal devices to industrial systems. As the proliferation of connected devices continues to expand, particularly in Internet of Things (IoT) deployments, embedded systems, and mobile platforms, the selection of appropriate cryptographic protection becomes increasingly complex.

Traditional cryptographic evaluation approaches typically focus on individual performance metrics such as computational speed, memory consumption, or energy usage in isolation. These conventional methods often rely on theoretical analysis or simulation-based testing that may not accurately reflect real-world deployment conditions. Furthermore, existing evaluation frameworks generally provide raw performance data without offering guidance on how to balance competing requirements or make informed decisions about algorithm selection for specific use cases.

Resource-constrained environments present challenges for cryptographic implementation. Devices such as wireless sensors, embedded controllers, and battery-powered systems operate under strict limitations regarding available memory, processing power, and energy consumption. In these environments, the selection of an inappropriate cryptographic algorithm can lead to reduced system performance, shortened battery life, or inadequate security protection. The evaluation of cryptographic algorithms typically involves multiple competing factors that must be considered simultaneously. Security strength, computational efficiency, memory requirements, and energy consumption often present trade-offs where improving one aspect negatively impact others. Current evaluation methodologies lack standardized approaches for quantifying these trade-offs or providing unified metrics that can guide decision-making processes.

Existing benchmarking tools and evaluation frameworks generally operate in controlled laboratory environments or use simulated conditions that may not accurately represent the operational constraints of target deployment platforms. This disconnect between evaluation conditions and real-world performance can result in suboptimal algorithm selections that fail to meet the practical requirements of resource-constrained systems.

The growing complexity of cryptographic algorithm options, including traditional symmetric and asymmetric schemes as well as emerging post-quantum cryptographic approaches, further complicates the selection process. Engineers and system designers often lack comprehensive tools that can systematically evaluate multiple algorithm candidates while considering the specific constraints and requirements of their target platforms.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a system for evaluating cryptographic algorithms based on both security and implementation efficiency is provided. The system comprises a security parameters module configured to receive a security level value associated with a cryptographic algorithm. The system comprises an efficiency metrics collector configured to obtain performance measurements including at least energy consumption, memory usage, and execution time. The system comprises a configuration profile module configured to define weight values associated with each of the performance measurements. The system comprises a computation engine configured to calculate an Efficiency-Adjusted Security (EAS) score using a formula of the form:

$$EAS = \frac{S}{w_1 E + w_2 M + w_3 T}$$

wherein S represents the security level, E, M, and T represent energy, memory, and time respectively, and $w_1$, $w_2$, $w_3$ are user-defined weights. The system comprises a recommendation engine configured to rank or recommend cryptographic algorithms based on the computed EAS scores. The system comprises a user interface module for visualizing computed EAS scores and facilitating algorithm evaluation and selection for embedded deployment.

According to other aspects of the present disclosure, the system includes one or more of the following features. The efficiency metrics collector is configured to interface with external hardware sensors to capture real-time energy and timing data. The configuration profile module includes a set of predefined profiles for specific deployment contexts, each with corresponding weight values. The system further comprises an export module configured to generate compliance reports or algorithm deployment configurations based on EAS results. The computation engine is further configured to dynamically adjust weight values based on sensed device conditions or application runtime state. The user interface includes an interactive dashboard for side-by-side comparison of multiple cryptographic algorithms under varying profile conditions. The final output of the recommendation engine may be used to select and embed the chosen cryptographic algorithm into the firmware of a target embedded platform.

According to another aspect of the present disclosure, a method for evaluating cryptographic algorithms based on both security and implementation efficiency is provided. The method comprises receiving a security level value associated with a cryptographic algorithm. The method comprises obtaining efficiency metrics including energy consumption, memory usage, and execution time from a target platform. The method comprises applying a set of weights to each efficiency metric, wherein the weights reflect application-specific priorities. The method comprises computing an Efficiency-Adjusted Security (EAS) score using the formula:

$$EAS = \frac{S}{w_1 E + w_2 M + w_3 T}$$

where S is the security value, and E, M, T are the efficiency metrics. The method comprises ranking a plurality of candidate cryptographic algorithms based on their computed EAS scores. The method comprises outputting one or more recommended algorithms for deployment.

According to other aspects of the present disclosure, the method includes one or more of the following features. The step of applying weights includes selecting a configuration profile from a predefined set of profiles, each corresponding to a deployment context or device constraint scenario and comprising a fixed weight vector for energy, memory, and execution time. The ranking step comprises computing a security-to-cost ratio for each algorithm and generating a sorted list of candidates in descending order of EAS score. The method further comprises flashing or deploying the recommended algorithm into an embedded system as part of a secure firmware design cycle, wherein the EAS score determines which cryptographic primitive is used.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

Figure 1:
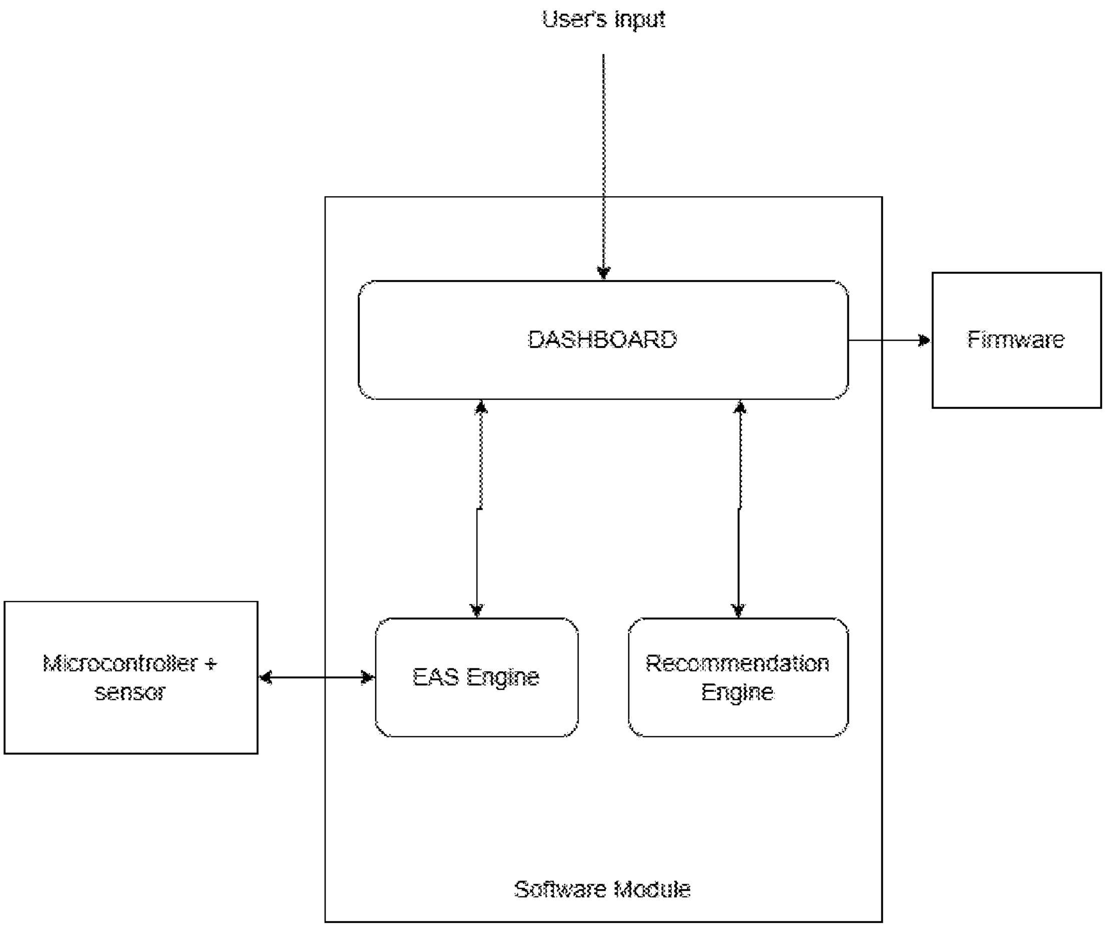
FIG. 1 illustrates a schematic view of a system for evaluating cryptographic algorithms, according to aspects of the present disclosure.

Referring to FIG. 1, and in accordance with the present invention, a system for evaluating cryptographic algorithms based on both security and implementation efficiency comprises several interconnected components that form an integrated hardware-software platform. The system includes a user interface component that receives user input and displays results to facilitate interaction with the evaluation platform. A software module contains a dashboard, an EAS Engine, and a Recommendation Engine that work together to process cryptographic algorithm evaluations. The dashboard receives configurations from the user and communicates bidirectionally with both the EAS Engine and the Recommendation Engine. In some cases, the dashboard serves as a central coordination point for managing evaluation parameters and presenting computed results. The EAS Engine processes performance data and generate efficiency-adjusted security scores, while the Recommendation Engine analyzes these scores to provide algorithmic recommendations.

As shown in FIG. 1, the proposed system further includes a microcontroller with a sensor that connects to the software module. The microcontroller with sensor receives configurations from the software module and sends energy data to the EAS Engine for processing. In some cases, the microcontroller with sensor captures real-time performance metrics during cryptographic algorithm execution, providing hardware-based measurements that form the foundation for efficiency calculations. The EAS Engine processes the energy data received from the microcontroller with sensor and generates EAS scores that are transmitted to both the dashboard and the Recommendation Engine. The Recommendation Engine analyzes the scores and provide recommendations back to the dashboard, creating a feedback loop that enables informed algorithm selection based on computed efficiency-adjusted security metrics. With continued reference to FIG. 1, the system additionally includes a firmware component that receives recommendation results from the software module for deployment purposes. The firmware component enables automated embedding of selected cryptographic algorithms into target embedded devices, completing the evaluation-to-deployment workflow. The architecture demonstrates a flow of information from user configuration through hardware measurement, computational analysis, algorithmic recommendation, and ultimately to firmware deployment, integrating hardware-based performance measurement with software-based scoring and decision-making to facilitate automated selection and deployment of cryptographic algorithms in resource-constrained environments.

Figure 2:
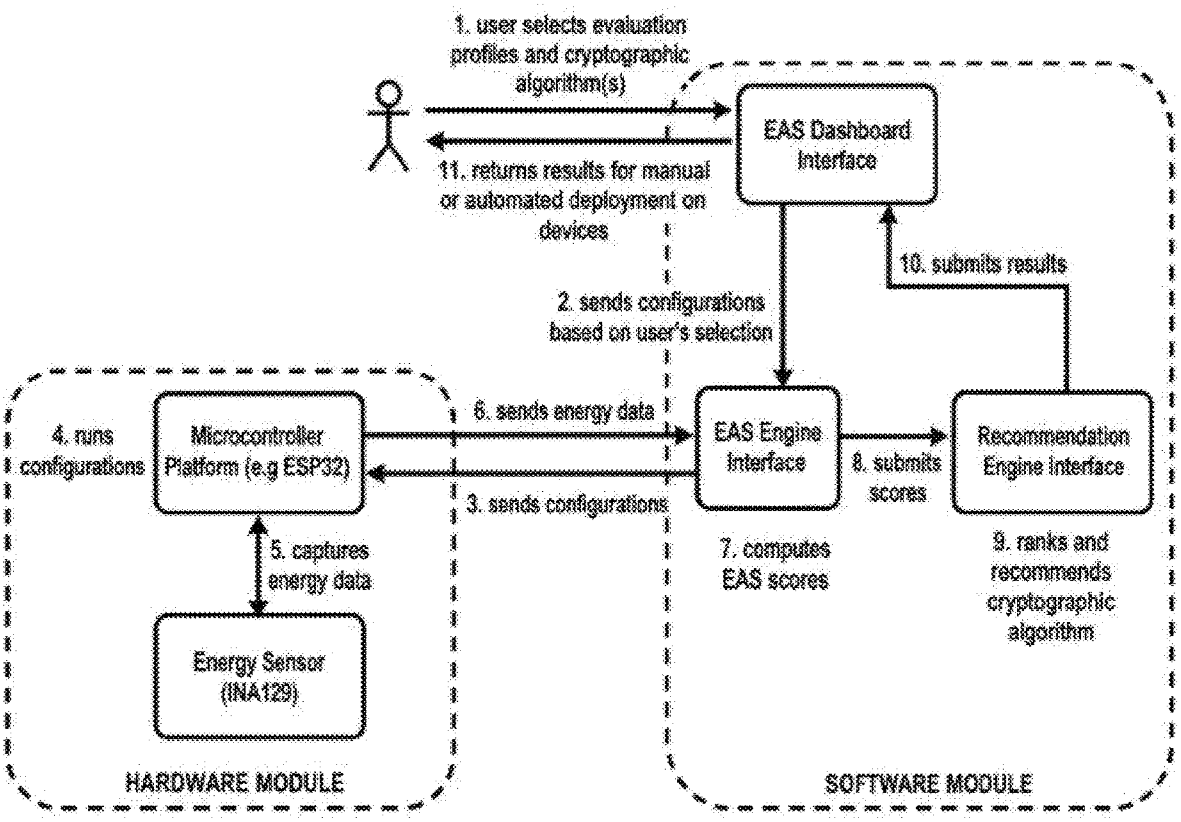
FIG. 2 depicts a schematic view showing interaction between hardware and software modules of the system, according to an embodiment.

Referring to FIG. 2, the hardware module comprises specific components that enable real-time measurement of cryptographic algorithm performance during execution. The hardware module includes a microcontroller platform, such as an ESP32 microcontroller, that serves as the target execution environment for cryptographic algorithms under evaluation. In some cases, the ESP32 microcontroller provides a representative embedded platform that mirrors the constraints and capabilities of typical resource-limited devices where cryptographic algorithms may be deployed. As shown in FIG. 2, the hardware module further includes an energy sensor, such as an INA219 sensor, that captures real-time energy consumption measurements during cryptographic operations. The INA219 sensor measures energy data in milliwatts with real-time monitoring capabilities, providing precise power consumption metrics that reflect actual hardware performance rather than theoretical estimates. The energy sensor interfaces directly with the microcontroller platform to monitor power draw during algorithm execution phases.

With continued reference to FIG. 2, a user (1) interacts with an EAS Dashboard Interface to select evaluation profiles and cryptographic algorithms. The user (1) sends configurations (2) to an EAS Engine Interface, which then transmit configurations (3) to the microcontroller platform within the hardware module. In some cases, these configurations specify which cryptographic algorithms to execute and what measurement parameters to collect during the evaluation process. The microcontroller platform executes the configurations and captures performance metrics including energy consumption, memory usage, and execution timing. The ESP32 microcontroller includes internal profiling capabilities that monitor memory usage through built-in memory management functions, tracking both RAM and ROM utilization during cryptographic operations. In some cases, the microcontroller platform measures execution latency in microseconds, providing precise timing measurements for each cryptographic operation cycle. As further shown in FIG. 2, the energy sensor captures energy data (5) from the microcontroller platform and transmits energy data (6) back to the EAS Engine Interface within the software module. This hardware-in-the-loop approach provides superior measurement fidelity compared to simulation-based or theoretical analysis methods, as the measurements reflect actual power consumption, memory allocation, and processing delays under realistic operating conditions. The real-time data collection accounts for hardware-specific factors such as clock speeds, voltage variations, and thermal effects that simulation environments not accurately represent.

The proposed system includes an efficiency metrics collector that obtains performance measurements including energy consumption, memory usage, and execution time from the hardware components. In some cases, the efficiency metrics collector interfaces with external hardware sensors to capture real-time energy and timing data during cryptographic algorithm execution. The efficiency metrics collector aggregates the measured data and forwards the performance measurements to computational components for further processing and analysis. The system additionally includes a security parameters module that receives a security level value associated with each cryptographic algorithm under evaluation. In some cases, the security level value may be derived from standardized cryptographic security classifications based on key lengths, algorithmic complexity, and formal security proofs. The security parameters module works in conjunction with the efficiency metrics collector to provide both security and performance data for comprehensive algorithm evaluation.

Referring to FIG. 2, the software module comprises several interconnected interfaces that facilitate the evaluation and recommendation process for cryptographic algorithms. The software module includes an EAS Dashboard Interface that serves as the primary user interaction point for configuring evaluation parameters and viewing computed results. In some cases, the EAS Dashboard Interface provides a user-friendly interface with interactive controls that enable users to customize evaluation settings and monitor real-time performance metrics.

As shown in FIG. 2, the EAS Dashboard Interface receives input from the user (1) who selects evaluation profiles and cryptographic algorithms for assessment. The user (1) interacts with the dashboard to specify which algorithms to evaluate and chooses from predefined configuration profiles such as Battery-Constrained, Latency-Critical, or Memory-Constrained profiles. In some cases, the EAS Dashboard Interface includes interactive sliders for custom weight adjustment that allow users to manually configure the relative importance of energy consumption, memory usage, and execution time parameters. The software module further includes an EAS Engine Interface that processes the configurations (2) received from the EAS Dashboard Interface. The EAS Engine Interface serves as a computational hub that coordinates the evaluation process by transmitting the configurations (3) to the microcontroller platform and processing the returned performance data. In some cases, the EAS Engine Interface manages the bidirectional data flow between the software and hardware components, ensuring that evaluation parameters are properly communicated to the hardware platform and that measurement results are accurately captured for analysis.

With continued reference to FIG. 2, the EAS Engine Interface receives the energy data (6) from the hardware module and processes this information along with memory usage and execution timing measurements to compute performance metrics. The EAS Engine Interface calculates EAS scores (7) using the efficiency-adjusted security formula that combines the security level value with the weighted performance measurements. In some cases, the computed EAS scores (7) represent a quantitative assessment of each cryptographic algorithm's suitability for the specified deployment constraints. As further shown in FIG. 2, the software module includes a Recommendation Engine Interface that receives scores (8) from the EAS Engine Interface for algorithmic ranking and selection. The Recommendation Engine Interface analyzes the computed scores and generates a recommendation (9) that identifies the most suitable cryptographic algorithm based on the evaluation criteria. In some cases, the Recommendation Engine Interface ranks multiple candidate algorithms in descending order of their EAS scores to provide users with a prioritized list of deployment options. The Recommendation Engine Interface further submits the recommendation (9) as results (10) to the EAS Dashboard Interface, thereby completing the evaluation workflow. The EAS Dashboard Interface then presents results (11) to the user (1) for manual or automated deployment on target devices. In some cases, the results (11) include detailed performance breakdowns, comparative analysis between algorithms, and deployment recommendations tailored to the selected evaluation profile.

In another embodiment, the system includes a user interface module for visualizing computed EAS scores and facilitating algorithm evaluation and selection for embedded deployment. The user interface module provides real-time visualization of metrics including energy consumption, memory usage, and execution timing measurements collected during the evaluation process. In some cases, the user interface module displays side-by-side comparisons of multiple cryptographic algorithms under varying profile conditions, enabling users to assess how different algorithms perform across different constraint scenarios. The user interface module includes an interactive dashboard for side-by-side comparison of multiple cryptographic algorithms under varying profile conditions. The interactive dashboard presents graphical representations of EAS scores, performance metrics, and algorithmic rankings in a format that facilitates rapid assessment and decision-making. In some cases, the interactive dashboard enables users to dynamically adjust evaluation parameters and provides immediate feedback on how parameter changes affect algorithmic rankings and recommendations.

The proposed system includes a computation engine configured to calculate an Efficiency-Adjusted Security (EAS) score using a formula of the form:

$$EAS = \frac{S}{w_1E + w_2M + w_3T}$$

In this formula, S represents the security level, E, M, and T represents energy, memory, and time respectively, and $w_1$, $w_2$, $w_3$ are user-defined weights that reflect application-specific priorities. The computation engine processes the performance measurements received from the efficiency metrics collector and combines these measurements with the security level value to generate a quantitative assessment of each cryptographic algorithm's suitability for deployment.

The security level value S represents a quantified cryptographic security level expressed in bits or standardized security categories that reflect the algorithmic strength and resistance to cryptanalytic attacks. In some cases, the security level value S is derived from established cryptographic standards such as NIST security classifications or is based on equivalent key lengths for symmetric and asymmetric cryptographic algorithms. The security level value S serves as the numerator in the EAS formula, representing the cryptographic benefit that each algorithm provides to the target system. The energy consumption parameter E represents power usage measured in milliwatts during cryptographic operations, capturing the actual electrical power draw of the microcontroller platform during algorithm execution. The memory usage parameter M represents total memory consumption in bytes, combining both RAM and ROM utilization during cryptographic operations. In some cases, the memory usage parameter M includes stack memory, heap allocation, and code storage requirements that reflect the complete memory footprint of each cryptographic algorithm implementation.

The execution time parameter T represents the duration of cryptographic operations measured in microseconds, providing precise timing measurements that reflect the computational complexity and processing requirements of each algorithm. In some cases, the execution time parameter T includes initialization overhead, core cryptographic operations, and cleanup procedures to provide a comprehensive assessment of temporal resource consumption. The combination of E, M, and T parameters form a weighted cost function in the denominator of the EAS formula. The weight parameters $w_1$, $w_2$, $w_3$ are tunable values that enable customization of the evaluation process based on specific deployment constraints and application requirements. The weight parameter $w_1$ controls the relative importance of energy consumption in the overall evaluation, while $w_2$ controls the influence of memory usage, and $w_3$ controls the significance of execution time. In some cases, the weight parameters sum to unity to maintain consistent scaling across different evaluation scenarios, though alternative normalization approaches may be employed depending on the specific implementation requirements.

The computation engine calculates the EAS score by dividing the security level value S by the weighted sum of the efficiency metrics, yielding a security-to-cost ratio that enables objective comparison between different cryptographic algorithms. Higher EAS scores indicate superior trade-offs between cryptographic strength and resource consumption, providing a quantitative basis for algorithmic selection and deployment decisions. In some cases, the ratio structure of the EAS formula enables direct comparison between algorithms with different security levels and performance characteristics, as the formula normalizes security benefits against resource costs. The computation engine processes multiple cryptographic algorithms simultaneously and generates corresponding EAS scores for each candidate algorithm based on their measured performance characteristics and assigned security levels. In some cases, the computation engine maintains a database of security level values for common cryptographic algorithms, enabling automated assignment of S values based on algorithm identification and configuration parameters. The computation engine then outputs the calculated EAS scores to the recommendation engine for ranking and selection processing.

As another aspect of the present invention, is disclosed a method for evaluating cryptographic algorithms including computing an Efficiency-Adjusted Security (EAS) score using the formula:

$$EAS = \frac{S}{w_1 E + w_2 M + w_3 T},$$

where S is the security value, and E, M, T being the efficiency metrics collected from hardware execution of the cryptographic algorithms. The method involves applying the weight parameters $w_1$, $w_2$, $w_3$ according to the selected configuration profile to customize the evaluation process for specific deployment scenarios. In some cases, the method may generate EAS scores that provide a standardized metric for comparing cryptographic algorithms across different security levels and performance characteristics.

The EAS scoring methodology enables systematic evaluation of cryptographic algorithms by converting disparate performance measurements into a unified metric that balances security benefits against resource costs. The formula structure provides mathematical consistency across different algorithm types and deployment scenarios, enabling reproducible and objective algorithmic assessments. In some cases, the EAS scoring approach facilitates automated decision-making processes by providing quantitative rankings that can be processed by recommendation engines and deployment systems without manual intervention. The system further includes a configuration profile module configured to define weight values associated with each of the performance measurements collected during cryptographic algorithm evaluation. The configuration profile module provides a structured approach to customizing the relative importance of energy consumption, memory usage, and execution time parameters based on specific deployment contexts and application requirements. In some cases, the configuration profile module enables users to select from predefined weight configurations or allows custom weight specification to accommodate specialized deployment scenarios.

In another embodiment, the configuration profile module further includes a set of predefined profiles for specific deployment contexts, each with corresponding weight values that reflect common constraint scenarios encountered in embedded systems and resource-limited devices. These predefined profiles simplify the evaluation process by providing pre-configured weight vectors that correspond to typical deployment priorities such as power conservation, performance optimization, or memory efficiency. In some cases, the predefined profiles eliminate the need for manual weight configuration while ensuring that the evaluation process remains aligned with practical deployment constraints. A Balanced profile utilizes weight values of $w_1$=0.33, $w_2$=0.33, $w_3$=0.34 for energy, memory, and execution time parameters respectively. The said Balanced profile provides equal consideration to all three-efficiency metrics, making the profile suitable for general-purpose applications where no single resource constraint dominates the deployment requirements. In some cases, the Balanced profile serves as a default configuration for initial algorithm evaluations or for applications where resource trade-offs are not clearly defined.

In another embodiment, the said Battery-Constrained profile employs weight values of $w_1$=0.60, $w_2$=0.25, $w_3$=0.15, emphasizing energy consumption as the primary evaluation criterion. The Battery-Constrained profile is particularly suitable for battery-powered devices such as wireless sensors, portable monitoring equipment, or remote IoT devices where power consumption directly impacts operational lifetime. In some cases, the Battery-Constrained profile prioritizes algorithms that minimize energy usage even at the expense of increased memory consumption or longer execution times. A Latency-Critical profile utilizes weight values of $w_1$=0.20, $w_2$=0.20, $w_3$=0.60, prioritizing execution time performance over energy and memory considerations. The Latency-Critical profile is appropriate for real-time applications such as industrial control systems, automotive safety systems, or communication protocols where processing delays impact system functionality or safety. In some cases, the Latency-Critical profile may favor algorithms that provide rapid cryptographic operations regardless of higher power consumption or memory requirements.

In accordance with the present invention, a Memory-Constrained profile employs weight values of $w_1$=0.20, $w_2$=0.60, $w_3$=0.20, emphasizing memory efficiency as the dominant evaluation factor. The Memory-Constrained profile is suitable for microcontroller-based systems with limited RAM or ROM capacity, such as 8-bit or 16-bit embedded processors where memory availability represents the primary deployment limitation. In some cases, the Memory-Constrained profile may select algorithms that minimize memory footprint even when such algorithms require additional processing time or energy consumption.

The configuration profile module additionally provides a Custom Profile option that allows user-defined weight vectors for specialized deployment scenarios not addressed by the predefined profiles. The Custom Profile option enables users to specify arbitrary weight values for $w_1$, $w_2$, and $w_3$ parameters, providing flexibility for unique constraint combinations or experimental evaluation configurations. In some cases, the Custom Profile option includes validation mechanisms to ensure that user-specified weights maintain mathematical consistency and produce meaningful EAS score calculations.

The predefined profiles map specific deployment contexts and device constraint scenarios into quantitative weight vectors that reflect the relative importance of different resource limitations. Each profile represents a mathematical encoding of deployment priorities, translating qualitative constraint descriptions such as "battery-sensitive" or "memory-limited" into numerical weight parameters that guide the EAS calculation process. In some cases, the profile mapping approach enables systematic evaluation of cryptographic algorithms across diverse deployment scenarios without requiring detailed knowledge of weight parameter selection or optimization techniques. The configuration profile module works in conjunction with the computation engine to apply the selected weight values during EAS score calculation. The weight values are incorporated into the denominator of the EAS formula as multiplicative factors that scale the relative contribution of each efficiency metric to the overall cost assessment. In some cases, the configuration profile module validates that the selected weight values maintain appropriate mathematical properties such as positive values and reasonable scaling relationships between different metrics.

The computation engine is further configured to dynamically adjust weight values based on sensed device conditions or application runtime state. Dynamic weight adjustment enables the proposed system to adapt the evaluation criteria in response to changing operational conditions such as declining battery levels, varying computational loads, or fluctuating memory availability. In some cases, dynamic adjustment may modify the weight parameters during system operation to maintain optimal algorithm selection as device constraints evolve over time. The dynamic weight adjustment features allow for monitoring device conditions including battery level, available memory, and processing demands to determine when weight parameter modifications are appropriate. The computation engine includes sensor interfaces or system monitoring capabilities that track device state parameters and trigger weight adjustments when predefined threshold conditions are detected. In some cases, the dynamic adjustment mechanism gradually transitions between different profile configurations to avoid abrupt changes in algorithm selection behavior.

In accordance with the present invention, the method for evaluating cryptographic algorithms includes applying a set of weights to each efficiency metric, wherein the weights reflect application-specific priorities determined by the deployment context and resource constraints. The weight application process involves selecting appropriate weight values from the configuration profile module and incorporating these values into the EAS calculation formula. In some cases, the method includes validation steps to ensure that the applied weights produce mathematically consistent and interpretable EAS scores. The method further includes selecting a configuration profile from a predefined set of profiles, each corresponding to a deployment context or device constraint scenario and comprising a fixed weight vector for energy, memory, and execution time parameters. The profile selection process involves analyzing the target deployment environment to identify the most appropriate constraint priorities and matching these priorities to the available predefined profiles. In some cases, the method may include profile recommendation capabilities that suggest suitable profiles based on device specifications or application requirements.

The fixed weight vectors provide consistent evaluation criteria that enable reproducible algorithm assessments across similar deployment scenarios. Each weight vector represents a validated configuration that has been optimized for specific constraint patterns commonly encountered in embedded system deployments. In some cases, the fixed weight vectors serve as reference configurations that facilitate comparative analysis between different deployment contexts or enable standardized evaluation procedures for algorithm certification or compliance assessment.

Figure 3:
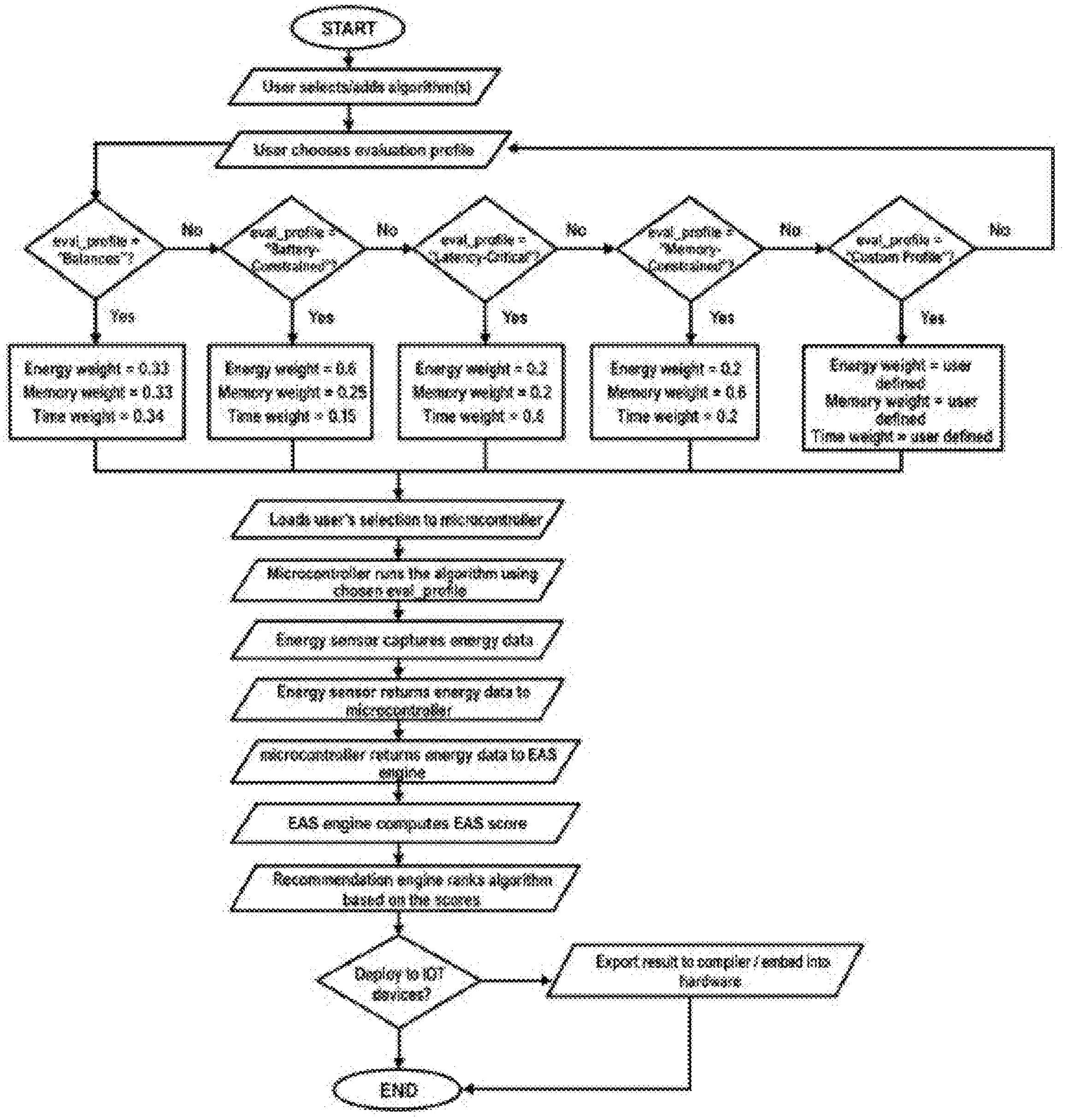
FIG. 3 illustrates a flowchart for an evaluation and deployment process, according to aspects of the present disclosure.

Referring to FIG. 3, the proposed system operates through a comprehensive five-step operational workflow that encompasses configuration, execution, scoring, selection, and deployment phases to facilitate systematic evaluation and automated deployment of cryptographic algorithms. The operational workflow begins with a configuration phase where a user selects or adds algorithms for evaluation and chooses an evaluation profile that determines the weight parameters for the assessment process. In some cases, the configuration phase establishes the foundational parameters that guide the subsequent evaluation steps and determine how performance metrics are weighted during the scoring calculations. As shown in FIG. 3, the configuration phase includes a decision logic structure that processes the user's evaluation profile selection through a series of conditional checks. The system first determines whether the evaluation profile is "Balanced" and, if confirmed, sets energy weight to 0.33, memory weight to 0.33, and time weight to 0.34. If the Balanced profile is not selected, the system will proceed to evaluate whether the profile is "Battery-Constrained" and then assigns energy weight to 0.6, memory weight to 0.25, and time weight to 0.15 when this condition is met. With continued reference to FIG. 3, the decision logic continues by checking whether the evaluation profile is "Latency-Critical" and sets energy weight to 0.2, memory weight to 0.2, and time weight to 0.6 when this profile is selected. The system subsequently evaluates whether the profile is "Memory-Constrained" and assigns energy weight to 0.2, memory weight to 0.6, and time weight to 0.2 for this configuration. In some cases, the system checks for a "Custom Profile" selection and sets energy weight, memory weight, and time weight to user-defined values when custom configuration is requested.

The weight assignment process ensures that each evaluation profile corresponds to specific numerical weight values that reflect the relative importance of energy consumption, memory usage, and execution time parameters. The decision logic provides systematic weight allocation based on the selected profile, eliminating ambiguity in parameter configuration and ensuring consistent evaluation criteria across different assessment scenarios. In some cases, the weight assignment validates that the selected profile produces mathematically appropriate weight distributions for the EAS calculation process.

As further shown in FIG. 3, the execution phase commences after weight assignment, where the user's selection is loaded to a microcontroller for algorithm execution under the chosen evaluation profile. The microcontroller then runs the selected algorithm using the specified evaluation parameters, creating a controlled execution environment where performance metrics can be accurately measured. In some cases, the execution phase involves multiple algorithm candidates being processed sequentially to generate comparative performance data for the scoring phase. The execution phase includes data capture mechanisms where an energy sensor captures energy data during algorithm execution and returns the energy data to the microcontroller for processing. The microcontroller collects comprehensive performance metrics including energy consumption, memory usage, and execution timing measurements that reflect the actual resource utilization of each cryptographic algorithm. In some cases, the data capture process ensures that measurements are collected under consistent operating conditions to maintain evaluation accuracy and reproducibility.

With continued reference to FIG. 3, the data return flow involves the microcontroller returning energy data to an EAS engine for computational processing. The EAS engine receives the performance measurements along with the previously assigned weight parameters and security level values to compute EAS scores for each evaluated algorithm. In some cases, the data flow between hardware and software components are coordinated to ensure that performance measurements are accurately associated with their corresponding algorithms and evaluation configurations. The scoring phase involves the EAS engine computing EAS scores using the collected metrics and the weight parameters established during the configuration phase. The EAS engine applies the formula $$EAS = \frac{S}{w_1 E + w_2 M + w_3 T},$$

to generate quantitative scores that represent the security-to-cost ratio for each evaluated cryptographic algorithm. In some cases, the scoring phase processes multiple algorithms simultaneously and generates a comprehensive set of EAS scores that enable comparative analysis between different cryptographic candidates.

As shown in FIG. 3, the selection phase involves a recommendation engine that ranks algorithms based on the computed EAS scores to identify the most suitable cryptographic algorithm for deployment. The recommendation engine analyzes the EAS scores and generates a ranking mechanism that produces a sorted list of candidate algorithms in descending order of EAS score. In some cases, the ranking process provides users with a prioritized list of algorithms where higher-ranked algorithms represent superior trade-offs between cryptographic security and resource efficiency. The recommendation engine is configured to rank a plurality of cryptographic algorithms based on their computed EAS scores, providing systematic algorithmic selection based on quantitative performance assessments. The ranking process involves computing a security-to-cost ratio for each algorithm through the EAS calculation and generates a sorted list of candidates that facilitates informed deployment decisions. In some cases, the recommendation engine then outputs one or more recommended algorithms for deployment based on the ranking results and user-specified selection criteria.

The ranking mechanism processes the computed EAS scores to generate a descending order arrangement where algorithms with higher EAS scores receive higher priority rankings. The sorted list provides users with clear guidance regarding which algorithms offer the most favorable security-to-cost ratios under the specified evaluation constraints. In some cases, the ranking mechanism includes tie-breaking procedures for algorithms with similar EAS scores and provides additional metadata such as individual performance metric values to support deployment decision-making. With continued reference to FIG. 3, the deployment phase determines whether to deploy the selected algorithm to IoT devices and proceeds to export results to a compiler or embed the algorithm into hardware based on the deployment decision. The deployment phase involves automated firmware generation where the selected cryptographic algorithm is integrated into target device firmware for operational use. In some cases, the deployment phase includes validation steps to ensure that the selected algorithm is compatible with the target hardware platform and meets the specified deployment requirements.

The method for evaluating cryptographic algorithms includes ranking a plurality of candidate cryptographic algorithms based on their computed EAS scores to facilitate systematic algorithm selection. The ranking process involves processing the EAS scores generated during the scoring phase and arranges the candidate algorithms in order of their security-to-cost performance ratios. In some cases, the method includes generating a sorted list of candidates in descending order of EAS score, where higher-scoring algorithms receive priority consideration for deployment. The method further includes outputting one or more recommended algorithms for deployment based on the ranking results and evaluation criteria. The output process provides users with specific algorithm recommendations that reflect the optimal trade-offs between cryptographic security and resource efficiency for the specified deployment context. In some cases, the method includes automated deployment capabilities where the highest-ranked algorithm is automatically selected and embedded into target device firmware without requiring manual intervention.

In accordance with the present invention, the complete operational workflow integrates the five phases into a cohesive evaluation and deployment process that transforms user-specified evaluation criteria into deployed cryptographic implementations. The workflow provides systematic progression from initial configuration through hardware-based measurement, computational analysis, algorithmic ranking, and automated deployment. In some cases, the operational workflow enables reproducible evaluation procedures that can be applied across different cryptographic algorithms, deployment contexts, and hardware platforms to ensure consistent and objective algorithm selection processes.

Figure 4:
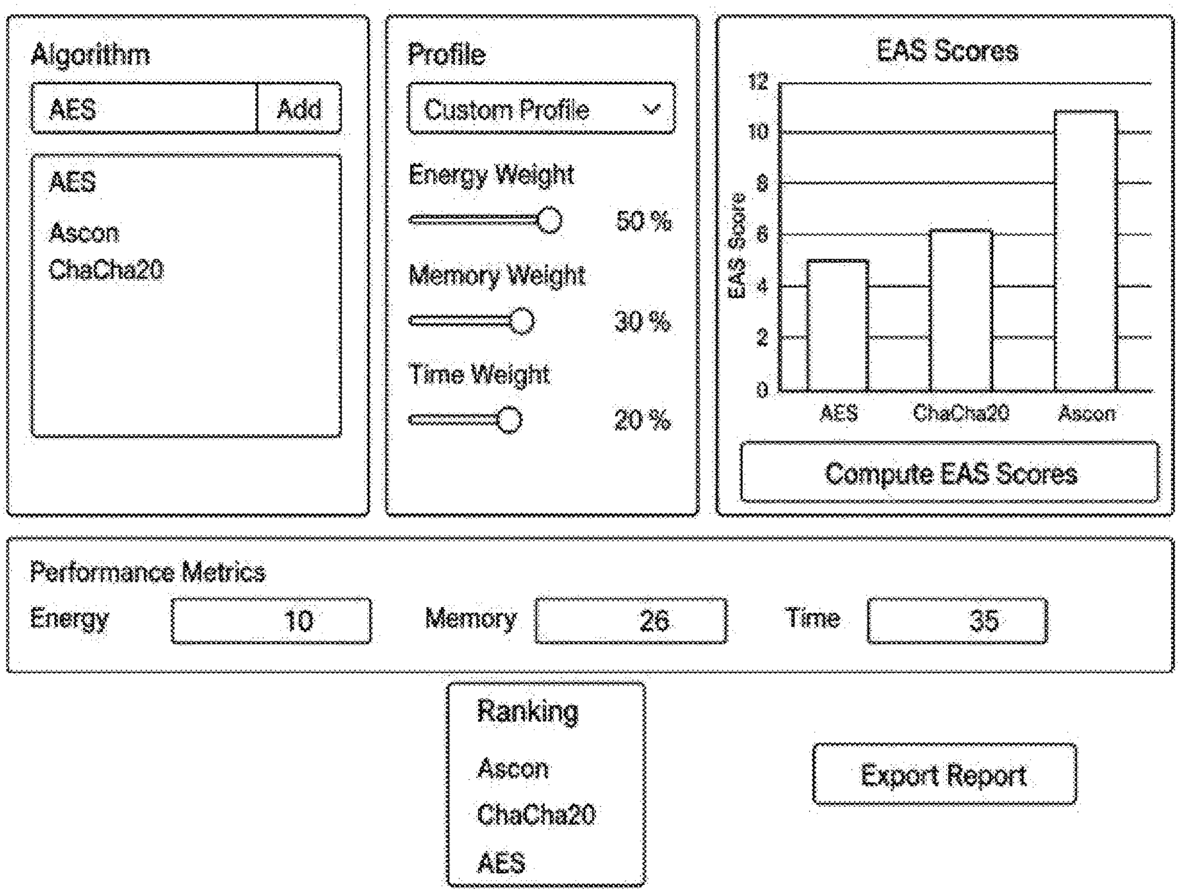
FIG. 4 depicts a dashboard interface for an EAS evaluation system, according to an embodiment.

Referring to FIG. 4, the system includes a user interface module that provides comprehensive visualization and interaction capabilities through an interactive dashboard interface designed to facilitate cryptographic algorithm evaluation and selection processes. The dashboard interface presents a structured layout that organizes evaluation controls, performance metrics, and results into distinct functional areas that enable users to configure evaluation parameters, monitor real-time performance data, and assess algorithmic rankings through visual representations. In some cases, the dashboard interface serves as the primary interaction point between users and the evaluation system, providing intuitive access to complex evaluation capabilities without requiring detailed technical knowledge of the underlying computational processes. As shown in FIG. 4, the dashboard interface includes an algorithm selection panel positioned on the left side of the interface that enables users to specify which cryptographic algorithms to include in the evaluation process. The algorithm selection panel displays a list of available cryptographic algorithms such as AES, Ascon, and ChaCha20, providing users with the ability to select multiple algorithms for comparative analysis. In some cases, the algorithm selection panel may include an "Add" button that allows users to incorporate additional cryptographic algorithms into the evaluation set, enabling customized algorithm comparisons based on specific deployment requirements or research objectives.

The algorithm selection panel provides a structured approach to managing the set of candidate algorithms that will be processed during the evaluation workflow. Users interact with the panel to build a customized list of algorithms that reflects their specific evaluation needs, whether for comparative research, deployment decision-making, or compliance assessment purposes. In some cases, the algorithm selection panel include algorithm metadata such as security classifications, implementation variants, or compatibility information to assist users in making informed selection decisions. With continued reference to FIG. 4, the dashboard interface includes a profile configuration section positioned in the center portion of the interface that provides interactive controls for customizing evaluation parameters. The profile configuration section features a dropdown menu labeled "Custom Profile" that enables users to select from predefined evaluation profiles or to specify custom weight configurations for specialized evaluation scenarios. In some cases, the profile configuration section may serve as the primary mechanism for translating deployment constraints and application requirements into quantitative evaluation parameters that guide the EAS calculation process.

The profile configuration section includes three interactive sliders that provide real-time adjustment capabilities for Energy Weight, Memory Weight, and Time Weight parameters. The interactive sliders enable users to dynamically modify the relative importance of energy consumption, memory usage, and execution time factors within the EAS calculation formula. In some cases, the interactive sliders display corresponding percentage values such as 50%, 30%, and 20% respectively, providing immediate visual feedback regarding the current weight distribution and enabling users to understand how their adjustments affect the evaluation criteria. As further shown in FIG. 4, the interactive sliders provide intuitive weight adjustment mechanisms that allow users to customize the evaluation process without requiring detailed knowledge of the underlying mathematical formulations. The sliders enable continuous adjustment of weight parameters within appropriate ranges, providing flexibility for fine-tuning evaluation criteria to match specific deployment contexts or constraint priorities. In some cases, the interactive sliders include validation mechanisms that ensure weight parameters maintain mathematical consistency and produce meaningful EAS score calculations.

With continued reference to FIG. 4, the dashboard interface includes an EAS Scores section that presents a bar chart visualization showing comparative scores for the evaluated cryptographic algorithms. Also, as shown, the EAS Scores section includes a "Compute EAS Scores" button positioned below the bar chart that enables users to initiate the evaluation process for the selected algorithms and configuration parameters. The compute button triggers the complete evaluation workflow including hardware-based measurement, score calculation, and results visualization. In some cases, the compute button provides users with control over when the evaluation process executes, enabling them to configure all evaluation parameters before initiating the potentially time-consuming measurement and calculation procedures.

In an embodiment, the dashboard interface includes a Performance Metrics section that displays numerical values for the individual performance parameters collected during the evaluation process. The Performance Metrics section presents values such as Energy at 10, Memory at 26, and Time at 35, providing users with detailed insight into the underlying measurements that contribute to the EAS score calculations. In some cases, the Performance Metrics display enables users to understand the specific resource consumption characteristics of each evaluated algorithm and to assess how individual metrics contribute to the overall EAS scores. The Performance Metrics display provides transparency in the evaluation process by exposing the raw measurement data that forms the foundation for the EAS calculations.

With continued reference to FIG. 4, the dashboard interface includes a Ranking section that presents the evaluated algorithms in order of their computed EAS scores. The Ranking section lists algorithms such as Ascon, ChaCha20, and AES in descending order of EAS performance, providing users with clear guidance regarding which algorithms offer superior security-to-cost trade-offs under the specified evaluation criteria. In some cases, the Ranking section serves as the primary output mechanism for the evaluation process, translating the computed EAS scores into actionable recommendations for algorithm deployment. The Ranking section provides systematic presentation of evaluation results that enables users to identify the most suitable cryptographic algorithms for their specific deployment requirements.

As further shown in FIG. 4, the dashboard interface includes an "Export Report" button positioned in the bottom right corner that enables users to generate comprehensive documentation of the evaluation results. The export functionality produces detailed reports that include the evaluation configuration, measured performance metrics, computed EAS scores, and algorithmic rankings in formats suitable for documentation, compliance assessment, or further analysis. In some cases, the export capability supports auditability requirements by providing complete records of the evaluation process and results that can be reviewed by stakeholders or regulatory authorities.

The visualization approach implemented in the dashboard interface supports auditability by providing transparent presentation of evaluation parameters, measurement data, and computational results. The comprehensive display of configuration settings, performance metrics, and scoring results enables users and reviewers to understand and validate the evaluation process. In some cases, the visualization approach facilitates compliance assessment by providing clear documentation of how algorithm selection decisions were made and what criteria were applied during the evaluation process. The dashboard interface enables repeatable benchmarking across different hardware profiles and deployment contexts by providing consistent evaluation procedures and standardized result presentation. The systematic approach to parameter configuration, measurement collection, and result visualization ensures that evaluation processes can be reproduced across different hardware platforms or deployment scenarios. The transparency features of the dashboard interface provide users with complete visibility into the evaluation process, from initial parameter configuration through final algorithmic recommendations. The interactive dashboard facilitates algorithm selection processes by providing intuitive controls, comprehensive visualization, and detailed result presentation that enable users to make informed deployment decisions.

The system further includes a recommendation engine configured to receive computed EAS scores from the computation engine and to process these scores through algorithmic ranking procedures that identify the most suitable cryptographic algorithms for deployment. The recommendation engine analyzes the EAS scores generated for each evaluated cryptographic algorithm and applies ranking algorithms that consider both the absolute score values and the relative performance differences between candidate algorithms. In some cases, the recommendation engine processes EAS scores for multiple cryptographic algorithms simultaneously, enabling comparative analysis across diverse algorithm families and implementation variants.

In an embodiment, the recommendation engine computes a security-to-cost ratio for each evaluated algorithm by processing the EAS scores that represent the mathematical relationship between cryptographic security strength and weighted resource consumption. The security-to-cost ratio computation utilizes the EAS formula structure where higher scores indicate more favorable trade-offs between cryptographic protection and resource utilization. The ranking process implemented by the recommendation engine generates an ordered list of candidate cryptographic algorithms arranged in descending order of EAS score, where algorithms achieving higher scores receive priority positions in the ranking. In some cases, the ranking process includes tie-breaking mechanisms for algorithms that achieve identical or nearly identical EAS scores, utilizing secondary criteria such as individual performance metrics or algorithm-specific characteristics to establish definitive ordering. The recommendation engine processes cryptographic algorithms including AES, Ascon, GIFT-COFB, TinyAES, and Speck, providing comprehensive evaluation capabilities across different algorithm families and cryptographic approaches.

The evaluation of AES implementations involves processing different key lengths and operational modes to assess how these variations affect the EAS scores under different constraint profiles. The recommendation engine distinguishes between AES-128, AES-192, and AES-256 variants, recognizing that different key lengths provide different security levels while potentially requiring different computational and memory resources.

In another embodiment, the proposed system includes a deployment module configured to automatically embed a selected cryptographic algorithm into embedded device firmware based on the ranking generated by the recommendation engine. The deployment module receives the final output of the recommendation engine and processes the algorithmic selection to generate firmware integration procedures that incorporate the chosen cryptographic algorithm into target embedded platforms. The deployment module generates firmware configuration artifacts that specify how the selected cryptographic algorithm should be integrated into the target embedded system architecture. The automated firmware deployment process utilizes the EAS score as the determining factor for which cryptographic primitive is integrated into operational firmware for resource-constrained devices. The deployment module selects the highest-ranked algorithm from the recommendation engine output and automatically initiates the firmware embedding process without requiring manual intervention. In some cases, the EAS score-based selection ensures that the deployed cryptographic primitive represents the optimal trade-off between security strength and resource efficiency for the specific deployment context and constraint profile.

The deployment module includes safeguards configured to validate algorithm compatibility with target hardware constraints before firmware embedding to prevent misdeployment scenarios that could result in system failures or performance degradation. The safeguards perform compatibility checks including memory requirement validation, processing capability assessment, and interface compatibility verification to ensure that the selected algorithm can operate successfully within the target embedded environment. In some cases, the safeguards include rollback mechanisms that can restore previous firmware configurations if deployment validation fails or if post-deployment testing reveals compatibility issues. The compatibility validation process assesses whether the selected cryptographic algorithm's memory requirements fall within the available RAM and ROM capacity of the target embedded platform. The validation compares the algorithm's measured memory usage from the evaluation phase against the target device's memory specifications to prevent deployment of algorithms that exceed available memory resources. In some cases, the compatibility validation may account for memory fragmentation, stack usage, and other system memory requirements to ensure that sufficient memory remains available for normal system operation after algorithm deployment.

In an embodiment, the secure firmware design cycle incorporates the EAS-based algorithm selection as a systematic component of the embedded system development process, ensuring that cryptographic algorithm choices are based on quantitative performance assessments rather than subjective preferences or incomplete analysis. The design cycle integrates the evaluation and deployment system into existing firmware development workflows, enabling automated algorithm optimization as part of regular development iterations. In some cases, the secure firmware design cycle supports continuous optimization where algorithms may be re-evaluated and updated as system requirements evolve or as new cryptographic algorithms become available. The proposed system may also include an export module configured to generate compliance reports or algorithm deployment configurations based on EAS results to support documentation requirements and regulatory compliance processes. The export module processes the evaluation results, algorithmic rankings, and deployment decisions to produce comprehensive documentation that demonstrates the systematic approach used for cryptographic algorithm selection. In some cases, the export module generates reports in standardized formats that meet specific compliance requirements for industries such as healthcare, automotive, or aerospace where cryptographic algorithm selection decisions must be documented and justified. The compliance reports include detailed documentation of the evaluation methodology, measurement procedures, weight parameter selections, and algorithmic ranking results that led to the final deployment decision. The reports present the EAS scores, individual performance metrics, and comparative analysis between candidate algorithms in formats suitable for technical review and regulatory assessment. In some cases, the compliance reports may include traceability information that links the deployed algorithm back through the evaluation process to the original performance measurements and configuration parameters.

In another embodiment, the algorithm deployment configurations generated by the export module provide comprehensive specifications for how the selected cryptographic algorithm should be implemented, configured, and maintained within the target embedded system. The deployment configurations may include implementation guidelines, security parameters, performance expectations, and maintenance procedures that ensure proper algorithm operation throughout the system lifecycle. In some cases, the deployment configurations may serve as technical documentation for system integrators, maintenance personnel, or certification authorities who need to understand the cryptographic implementation details.

The export module supports multiple output formats including PDF reports, XML configuration files, JSON data structures, and CSV datasets to accommodate different documentation requirements and integration scenarios. The multiple format support enables the evaluation results to be incorporated into various downstream processes such as system documentation, compliance databases, or automated deployment pipelines. In some cases, the export module may provide customizable report templates that can be adapted to specific organizational requirements or regulatory standards. The deployment validation mechanisms include post-deployment testing procedures that verify the correct operation of the embedded cryptographic algorithm within the target system environment. The testing procedures include functional verification, performance validation, and security assessment to ensure that the deployed algorithm meets the expected operational requirements. In some cases, the post-deployment testing compare actual system performance against the predicted performance based on the EAS evaluation results, providing feedback that can improve future evaluation accuracy and deployment decisions.

The automated deployment system maintains deployment logs that record the algorithm selection decisions, deployment timestamps, configuration parameters, and validation results for audit and troubleshooting purposes. The deployment logs provide complete traceability of the deployment process and enable system administrators to understand how cryptographic algorithms were selected and deployed across multiple embedded devices. In some cases, the deployment logs support fleet management scenarios where multiple embedded devices require coordinated cryptographic algorithm updates based on changing operational requirements or security threats. The deployment module supports batch deployment capabilities that enable simultaneous algorithm deployment across multiple embedded devices or system configurations. The batch deployment maintains consistent algorithm selection criteria while accommodating device-specific constraints or configuration requirements that may vary between different deployment targets. In some cases, the batch deployment capabilities enable systematic cryptographic algorithm updates across entire embedded device fleets, ensuring that all devices utilize optimally selected algorithms based on current EAS evaluation results.

In another embodiment, the system supports evaluation of a comprehensive range of cryptographic algorithms spanning traditional symmetric encryption schemes, authenticated encryption algorithms, and lightweight cryptographic implementations designed for resource-constrained environments. The supported algorithm portfolio includes established cryptographic standards alongside emerging lightweight ciphers that have been specifically optimized for embedded system deployments. In some cases, the system may accommodate both standardized algorithms with well-established security classifications and newer cryptographic schemes that are undergoing evaluation for lightweight cryptographic applications. The Advanced Encryption Standard (AES) is supported across multiple key lengths including AES-128, AES-192, and AES-256 variants, enabling evaluation of different security-performance trade-offs within the AES algorithm family. The system may process AES implementations optimized for different operational modes such as Electronic Codebook (ECB), Cipher Block Chaining (CBC), Counter (CTR), and Galois/Counter Mode (GCM) to assess how mode selection affects resource consumption and execution performance.

The security level value S is derived from standardized cryptographic security classifications that express algorithmic strength in terms of equivalent bit security levels established by recognized standards organizations. The security quantification process utilizes security strength estimates published by the National Institute of Standards and Technology (NIST), the International Organization for Standardization (ISO), or other authoritative cryptographic standards bodies. In some cases, the security level derivation may incorporate formal security proofs, cryptanalytic resistance assessments, and peer-reviewed security evaluations to establish quantitative security strength values for each supported algorithm. The quantified security value S serves as the numerator in the EAS formula, representing the cryptographic benefit that each algorithm provides to the target system in a standardized numerical format. The security value integration enables direct mathematical combination with the efficiency metrics in the formula denominator to produce a unified assessment metric. In some cases, the security value is normalized or scaled to ensure mathematical compatibility with the efficiency measurements and to maintain consistent EAS score ranges across different algorithm families and security levels.

The EAS formula structure distinguishes the proposed system from generic weighted benchmark scores by incorporating the security level as a benefit term in the numerator rather than as another cost factor in a weighted sum. This mathematical formulation creates a security-to-cost ratio that directly represents the trade-off between cryptographic protection and resource consumption. In some cases, the ratio structure may enable meaningful comparison between algorithms with vastly different security levels and performance characteristics by normalizing security benefits against resource costs. Drone and unmanned aerial vehicle applications represent deployment scenarios where battery capacity limitations create stringent energy consumption constraints that directly affect flight duration and operational range. The system addresses the challenge of maintaining secure communication channels between drones and ground control stations while minimizing power consumption that could reduce flight time or payload capacity. In some cases, drone applications may require real-time cryptographic operations for telemetry data protection, command authentication, and sensor data encryption where processing delays could impact flight control responsiveness or mission effectiveness.

The real-time communication requirements of drone systems create execution time constraints where cryptographic operations must complete within specific timing windows to maintain flight control stability and communication link reliability. The system may evaluate cryptographic algorithms based on their ability to meet these timing requirements while providing sufficient security strength for the operational environment. In some cases, the evaluation considers how cryptographic processing delays could affect critical flight control loops or emergency response procedures that require immediate communication between the drone and control systems. The EAS evaluation framework addresses the real-world problem of balancing cryptographic security with operational constraints by providing quantitative assessment methodologies that enable systematic comparison of security benefits against resource costs. The framework eliminates subjective decision-making from cryptographic algorithm selection by providing mathematical metrics that reflect the specific constraint priorities of each deployment scenario. In some cases, the framework enables deployment-specific optimization where cryptographic algorithm selection can be tailored to the unique combination of security requirements and resource limitations present in each application environment.

In another embodiment, alternative energy measurement sensors may replace or supplement the INA219 sensor depending on measurement precision requirements and hardware compatibility constraints. In some cases, the system may incorporate current measurement integrated circuits such as MAX40080 or INA260 sensors that provide different measurement ranges, sampling rates, or communication interfaces. Power measurement may also be accomplished through voltage and current sensing circuits integrated directly into custom evaluation boards, enabling more specialized measurement configurations for specific embedded platforms. The recommendation engine may be extended to support multi-objective optimization approaches that consider additional constraints beyond the basic efficiency-security trade-off. In some cases, regulatory compliance requirements, certification standards, or application-specific performance thresholds may be incorporated as additional ranking criteria.

A number of implementations have been described. Nevertheless, it will be understood that various modifications may be made without departing from the spirit and scope of the disclosure. Accordingly, other implementations are within the scope of the following claims.

The invention claimed is:

1. A system for evaluating cryptographic algorithms based on both security and implementation efficiency, comprising one or more electronic devices executing instructions to perform operations including:

receiving a security level value S associated with a cryptographic algorithm;

obtaining performance measurements including energy consumption E, memory usage M, and execution time T from hardware execution of the cryptographic algorithm;

defining tunable weight parameters $w_1$, $w_2$, $w_3$ associated with each of the performance measurements;

calculating an Efficiency-Adjusted Security (EAS) score;

ranking a plurality of the cryptographic algorithm based on their computed EAS scores;

automatically embedding a selection of the plurality of cryptographic algorithm into embedded device firmware based on the rank; and generating firmware configuration artifacts and automatically embedding the selection of the plurality of cryptographic algorithm into microcontroller-based embedded systems, wherein the security level value S is derived from standardized cryptographic security levels based on key lengths and formal robustness indicators.

2. The system of claim 1, further comprising predefined profiles comprising a Battery-Constrained profile, a Latency-Critical profile, and a Memory-Constrained profile, each profile mapping specific device constraints to corresponding weight parameter values.

3. The system of claim 2, wherein the predefined profiles comprise specific weight parameter values, the Battery-Constrained profile having $w_1$=0.60, $w_2$=0.25, $w_3$=0.15, the Latency-Critical profile having $w_1$=0.20, $w_2$=0.20, $w_3$=0.60, and the Memory-Constrained profile having $w_1$=0.20, $w_2$=0.60, $w_3$=0.20.

4. The system of claim 1, wherein the Efficiency-Adjusted Security (EAS) score is calculated using a formula $$EAS = \frac{S}{w_1 E + w_2 M + w_3 T},$$

wherein the EAS score represents a security-to-cost ratio for ranking cryptographic algorithms.

5. The system of claim 1, wherein the one or more electronic devices comprise: a processing unit and at least one measurement component obtaining operational performance metrics, including energy consumption, execution timing, and memory usage, during execution of the cryptographic algorithm on target hardware.

6. The system of claim 5, wherein the processing unit comprises a microcontroller, a microprocessor, or a processor-based single-board computer, and wherein the at least one measurement component comprises any sensor or monitoring circuitry capable of measuring energy-related performance parameters of the target hardware.

7. The system of claim 1, wherein the operations further comprise dynamically adjusting the tunable weight parameters w1, w2, w3 based on runtime device conditions including battery level, available memory, and processing demands.

8. The system of claim 1, further comprising a user interface module displaying side-by-side comparisons of the plurality of cryptographic algorithm with their corresponding EAS scores and enable interactive selection of configuration profiles.

9. The system of claim 8, wherein the user interface module comprises an interactive dashboard visualizing real-time performance metrics and provide algorithmic ranking based on computed EAS scores.

10. The system of claim 1, further comprising: safeguards validating algorithm compatibility with target hardware constraints before firmware embedding.

11. A method for evaluating cryptographic algorithms based on both security and implementation efficiency, comprising:

receiving a security level value S associated with a cryptographic algorithm;

obtaining efficiency metrics including energy consumption E, memory usage M, and execution time T from hardware execution of the cryptographic algorithm on a target platform;

applying tunable weight parameters w1, w2, w3 to each efficiency metric according to a selected configuration profile from predefined profiles comprising a Battery-Constrained profile, a Latency-Critical profile, and a Memory-Constrained profile;

computing an Efficiency-Adjusted Security (EAS) score, ranking a plurality of the cryptographic algorithm based on their computed EAS scores;

automatically deploying a highest-ranked of the plurality of cryptographic algorithm into embedded system firmware; and generating firmware configuration artifacts and automatically embedding the highest-ranked of the plurality of cryptographic algorithm into microcontroller-based embedded systems, wherein the security level value S is derived from standardized cryptographic security levels based on key lengths and formal robustness indicators.

12. The method of claim 11, wherein the Efficiency-Adjusted Security (EAS) score is calculated using a formula $$EAS = \frac{S}{w_1 E + w_2 M + w_3 T},$$

wherein the EAS score represents a security-to-cost ratio for ranking cryptographic algorithms.

13. The method of claim 11, wherein the step of obtaining the efficiency metrics comprises capturing real-time energy consumption using a microcontroller and current sensor during execution of the cryptographic algorithm on the target platform.

14. The method of claim 13, wherein the microcontroller comprises an ESP32 microcontroller and the current sensor comprises an INA219 sensor.

15. The method of claim 11, wherein the predefined profiles comprise specific weight parameter values, the Battery-Constrained profile having $w_1$=0.60, $w_2$=0.25, $w_3$=0.15, the Latency-Critical profile having w1=0.20, w2=0.20, w3=0.60, and the Memory-Constrained profile having $w_1$=0.20, $w_2$=0.60, $w_3$=0.20.

16. The method of claim 11, further comprising dynamically adjusting the tunable weight parameters $w_1$, $w_2$, $w_3$ based on runtime device conditions including battery level, available memory, and processing demands.

17. The method of claim 11, further comprising generating firmware configuration artifacts and validating algorithm compatibility with target hardware constraints before automatically deploying the highest-ranked of the plurality of cryptographic algorithm into the embedded system firmware.

* * * * *